United States Patent

Sartorio

[15] 3,639,993
[45] Feb. 8, 1972

[54] IMPROVEMENTS RELATING TO MACHINES AND APPARATUS HAVING A SUPPORT FOR GUIDING A MOVABLE MEMBER

[72] Inventor: Franco Sartorio, Turin, Italy

[73] Assignee: D.E.A. Digital Electronic Automation Societa per Azioni, Turin, Italy

[22] Filed: Feb. 9, 1970

[21] Appl. No.: 9,778

Related U.S. Application Data

[63] Continuation-in-part of Ser. No. 627,759, Apr. 3, 1967, abandoned.

[30] Foreign Application Priority Data

Apr. 18, 1966 Italy..................................764,361/66

[52] U.S. Cl..............................33/174, 33/174 P, 33/174 L
[51] Int. Cl.........................................G01b 7/00, G01b 7/04
[58] Field of Search..............33/174 H, 174 J, 174 L, 174 P, 33/174 PC, 174 R

[56] References Cited

UNITED STATES PATENTS 3,386,174   6/1968   Leach....................................33/174 R
2,437,679   3/1948   Burgess..................................33/174 L

*Primary Examiner*—Leonard Forman
*Assistant Examiner*—Paul G. Foldes
*Attorney*—Sughrue, Rothwell, Mion, Zinn & Macpeak

[57] ABSTRACT

A machine with a working head for operating on a large stationary workpiece, e.g., to measure it, has a longitudinal guide track along which a first bridge is slidable. A second bridge is slidable along a longitudinal load-bearing track parallel to the longitudinal guide track. A headstock carrying the working head is guided along a transverse guide track on the first bridge. A carriage is movable along a transverse load-bearing track on the second bridge, parallel to the transverse guide track. At least the greater part of the weight of the headstock is carried by the carriage on the second bridge, an extensible elastic suspension being connected between the headstock and carriage. The weight of the first bridge is carried at least predominantly by the second bridge through extensible elastic suspension units. This system allows high accuracy of the working head while avoiding the need for heavy precision load-bearing guides.

7 Claims, 6 Drawing Figures

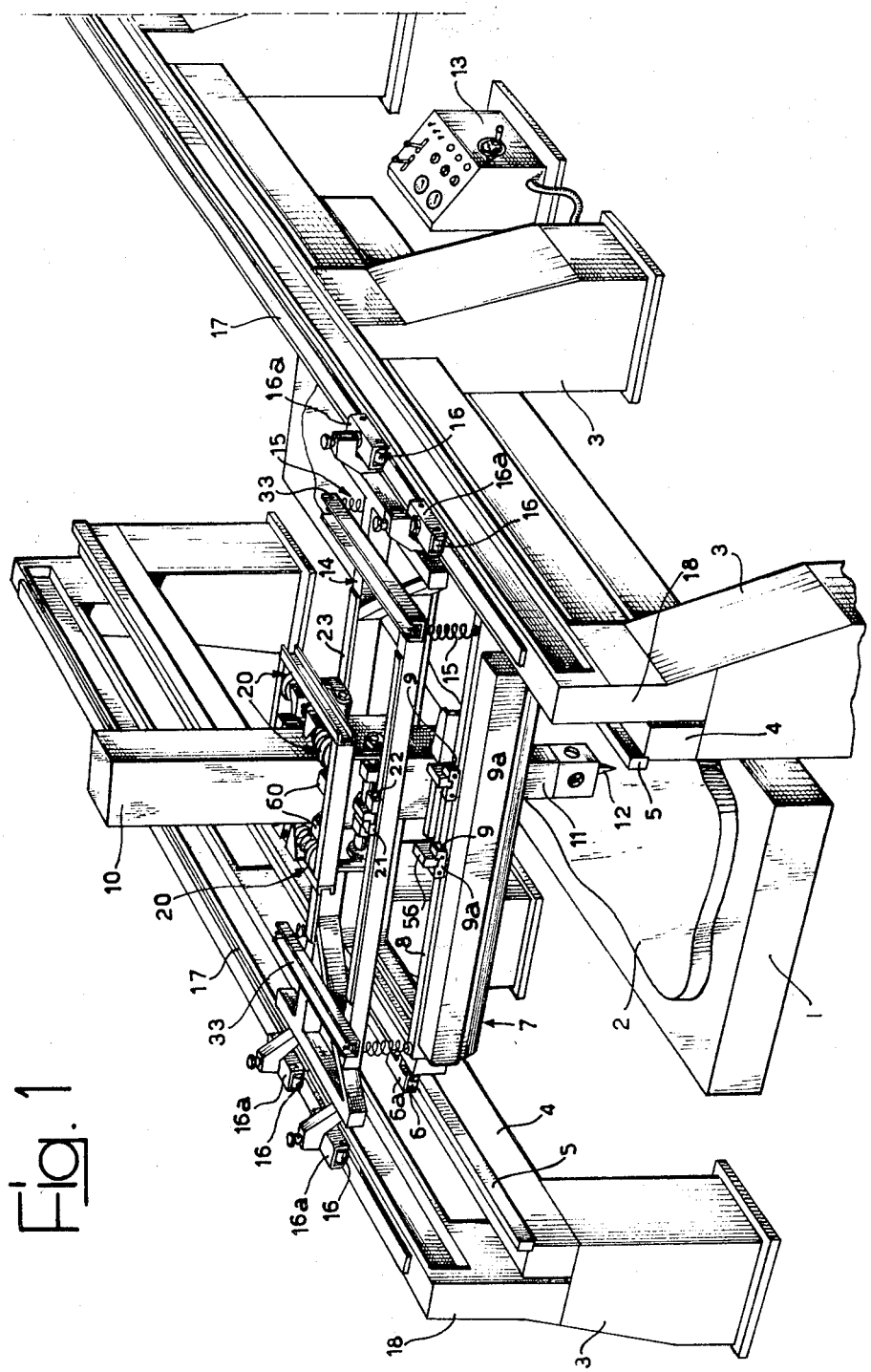

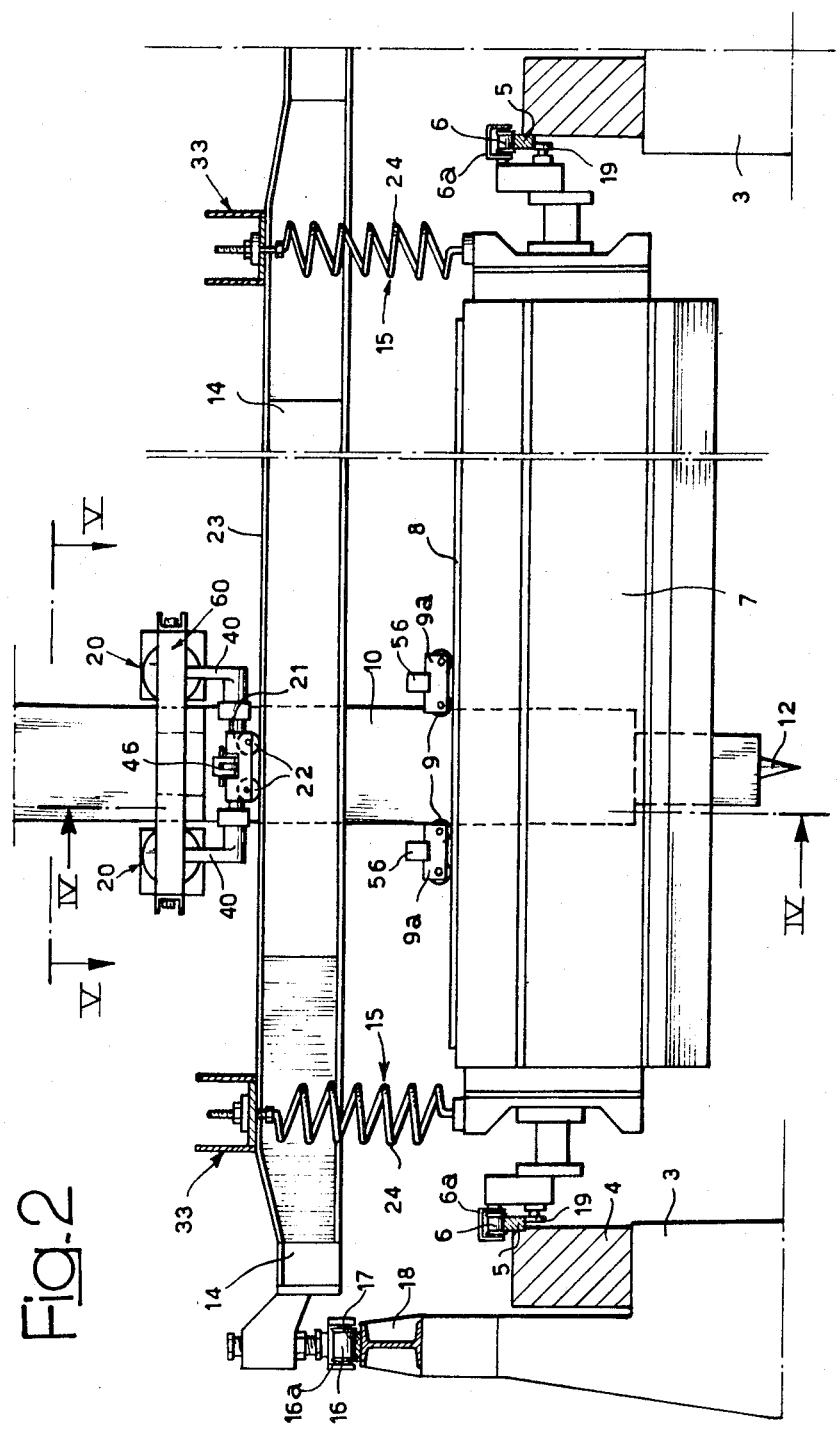

IMPROVEMENTS RELATING TO MACHINES AND APPARATUS HAVING A SUPPORT FOR GUIDING A MOVABLE MEMBER

This application is a continuation-in-part of my application Ser. No. 627,759 filed Apr. 3, 1967 and now abandoned.

The invention relates to a machine for working on a workpiece by passing a working head over the workpiece for such purposes as to measure it or machine it. The working head is supported in a headstock carried by a carriage, the headstock being guided along a path defined by a guide track such as a system of rails, there being a fixed maximum permissible error or deviation in the path as a result of deflection of the guide track during functioning of the machine.

The requirements set out above are frequently encountered in precision engineering, particularly in measuring machines and certain machine tools. Where the permissible error is small, such as 0.01 mm. per meter of path length, difficulties arise in satisfying these requirements, particularly where the workpiece and the machine are large and the weight of the headstock and carriage are relatively great.

Below a certain limit, which may for practical purposes be regarded as a horizontal working plane or area of 1×0.8 meters and a vertical height of 0.5 meters, this being the space which the working head must be able to traverse, it is generally feasible in technical and economic terms to provide a strong guide track on which bears at all times the full weight of the carriage and headstock and any auxiliary moving members. The machine then relies on the rigidity of the guide track to ensure that the error remains below the maximum permissible value.

Above the limit mentioned above, the cost of supplying a rigid support and sufficiently strong foundations to carry the weight of the machine becomes uneconomic. The functions of the guide track in defining a precision path and supporting the weight of the moving members must then be separated, special means being provided to bear at least the major part of the weight of the moving members. The guide track can then be manufactured as a relatively light precision member.

One known manner of relieving the guide track of the weight of the moving members is to counterbalance them through a system of pulleys, cables and counterweights. Where the machine is very large, with a working head stroke in one direction of the order of 10 meters, and when the maximum permissible error in the path is small, this system has severe disadvantages because of the complexity of the counterbalancing mechanism and the difficulties of moving it about readily with the headstock. The weight of the counterbalance also virtually doubles the load to be moved along the path, and makes such a system impractical and uneconomic in large machines. Furthermore since the machine is generally driven by closed loop servosystems, the mass and therefore the weight of the moving parts have a major importance in the dynamic response of the system.

Another expedient is to support the greater part of the weight of the carriage and headstock on hydraulic cylinders which move along a sturdy load-bearing track arranged substantially parallel to the guide track. The pressure in the cylinders is maintained constant for all positions of the working head. This system may be adequate in small machines in which the weight of the carriage and headstock and auxiliary members is relatively small. In large machines, however, there are disadvantages which make it impractical, among them the fact that good sealing is required in the hydraulic cylinders, giving them a high internal friction and so lowering the sensitivity of the response of the suspension to the point where high accuracy is not possible. The difficulties of providing suitable hydraulic controls and of allowing movement of hydraulic pipes carrying liquid under high pressure also limit the feasibility of the system.

It has been proposed in U.S. Pat. No. 3,377,711, inventor B. Wempe, to provide a precision machine such as a measuring apparatus with a support table on which the workpiece rests, the table being movable in a rectilinear path along a rail located under a working head in the form of a microscope. The table is slidable along a precision guide track which keeps the table at a constant height. The working head is movable on a hydraulic suspension of the kind mentioned above along a path parallel to that of the table. The table is supported elastically on its rail by means of two levers of adjustable length each extending obliquely from a pivot on the undersurface of an end of the table to a roller rolling on the rail. A torque spring with a flat characteristic is mounted at each pivot and operates on the lever to ensure that the weight of the table is transmitted to the rail. A complex weight distribution system is provided to ensure that the weight of the table is transmitted from the rail to the foundations without influencing the working head and its supporting structure.

This system is clearly designed for small machines, and has several limitations and advantages. Only longitudinal movement of the working head and the supporting table is possible. No provision is made for transverse or vertical movement. For carrying a heavy carriage and headstock, as is required in large machines, the hydraulic suspension is unsuitable for the reasons mentioned above. Moreover, there is a large internal friction in the torque spring and lever suspension at each end of the table, so that the system would be relatively insensitive to small deflections and under heavy loads would not function satisfactorily. Adjustment of the levers is necessary each time a new workpiece is placed on the table and each time the workpiece is moved on the table. Such adjustments are time consuming and are difficult to make accurately, particularly if the workpiece does not have a uniform weight distribution. The fact that only one rail is provided to support the weight of the table and workpiece from below limits the system to small workpieces and introduces the possibility of transverse instability. Finally, the fact that both the working head and the table are movable relatively to the foundations introduces undesirable complexity and increases the scope for error.

The object of the invention is to provide a machine suitable for operating on large workpieces, such as automobile bodies and aircraft body portions, to allow them to be measured or otherwise worked on with a high degree of accuracy. Such a machine may have a horizontal working plane of, for instance, 10×5.5 meters and a vertical stroke of 2.5 meters. Even in such large machines a maximum permissible error of 0.01 mm. per meter of working head stroke is possible under the invention.

A more specific object is to provide such a machine in which elastic suspension means is used to relieve the guide track of the weight of the headstock and associated moving components, the suspension means having a low friction so that the response of the suspension is extremely sensitive.

Broadly, the invention provides a machine for working on a workpiece by passing a working head over the workpiece in accordance with a path in which there is a fixed maximum permissible error, the machine comprising a bed on which the workpiece is adapted to rest, a longitudinal guide track composed of parallel guide members supported above the bed, a first bridge mounted on the longitudinal guide track and movable along it, a longitudinal load-bearing track composed of parallel load-bearing members spaced away from the longitudinal guide track and extending substantially parallel to it, a second bridge mounted on the longitudinal load-bearing track for movement with the first bridge, a transverse guide track on the first bridge and extending transversely of the longitudinal guide track, the longitudinal and transverse guide tracks defining the path which has the maximum permissible error, a headstock movable along the transverse guide track and carrying a working head that is adapted to work on the workpiece, a transverse load-bearing track supported on the second bridge and extending substantially parallel to the transverse guide track, a carriage movable on the transverse load-bearing track for movement with the headstock, elastic suspension means arranged between the carriage and the headstock to ensure that the transverse guide track is not deflected beyond its maximum permissible error in any transverse position of the headstock and elastic suspension means connected between the first bridge and the second bridge to ensure that the longitudinal guide track is not deflected beyond its maximum permissible error in any longitudinal position of headstock.

The elastic suspension means used in the machine, and particularly that connected between the first and second bridges, is preferably one or more coil springs, arranged vertically and under tension. This type of suspension can be constructed with a very low friction, virtually only the internal friction of the spring, so as to be extremely sensitive, while also being simple and robust and east to adjust.

An embodiment of the invention is described below with reference to the accompanying drawings, in which:

FIG. 1 is a perspective view from above of a measuring machine according to the invention;

FIG. 2 is a sectional transverse view through the machine of FIG. 1;

Figure 6:
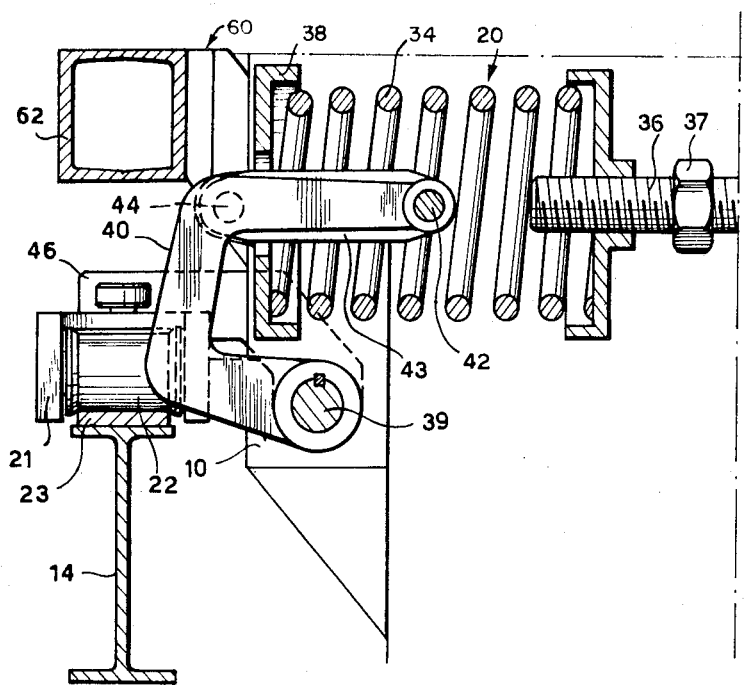
FIG. 6 is an enlarged view, partly broken away, on the line VI—VI of FIG. 5, showing the construction of an elastic suspension unit connected between the headstock and carriage of the machine.

The machine illustrated is suitable for determining the measurements of workpieces in three orthogonal coordinates and is particularly suitable for measuring very large members such as automobile bodies and aircraft body components. It has a detector probe which is brought into contact with preselected points on the surface of the workpiece. The values of the displacements of the probe in the system of coordinates correspond to the dimensions of the workpiece and may be converted into signals which are readily stored, for instance on magnetic tape.

As shown in FIG. 1, columns 3 are arranged on either side of a bed 1 (which may be a concrete slab or the floor or a table or the like) on which rests a workpiece 2 to be measured. The columns 3 carry supporting girders 4 for parallel precision rails 5 which form a longitudinal guide track situated in a plane parallel to and overlying the bed 1. A first bridge 7 in the form of a generally rectangular frame is slidably guided on the rails 5 by means of a pair of rollers 6 carried in a mounting 6a at each corner of the bridge. Pairs of rollers are used in this fashion wherever possible in the machine of the invention as they minimize the effect of any irregularity in the surface on which they roll, and consequently reduce the measuring error. Rollers 19 (FIG. 2) roll on the undersurface of the rails 5 and are biased upwards on the bridge 7 by means not illustrated to exert with the rollers 6 a light clamping action retaining the bridge 7 on the rails 5.

Figure 4:
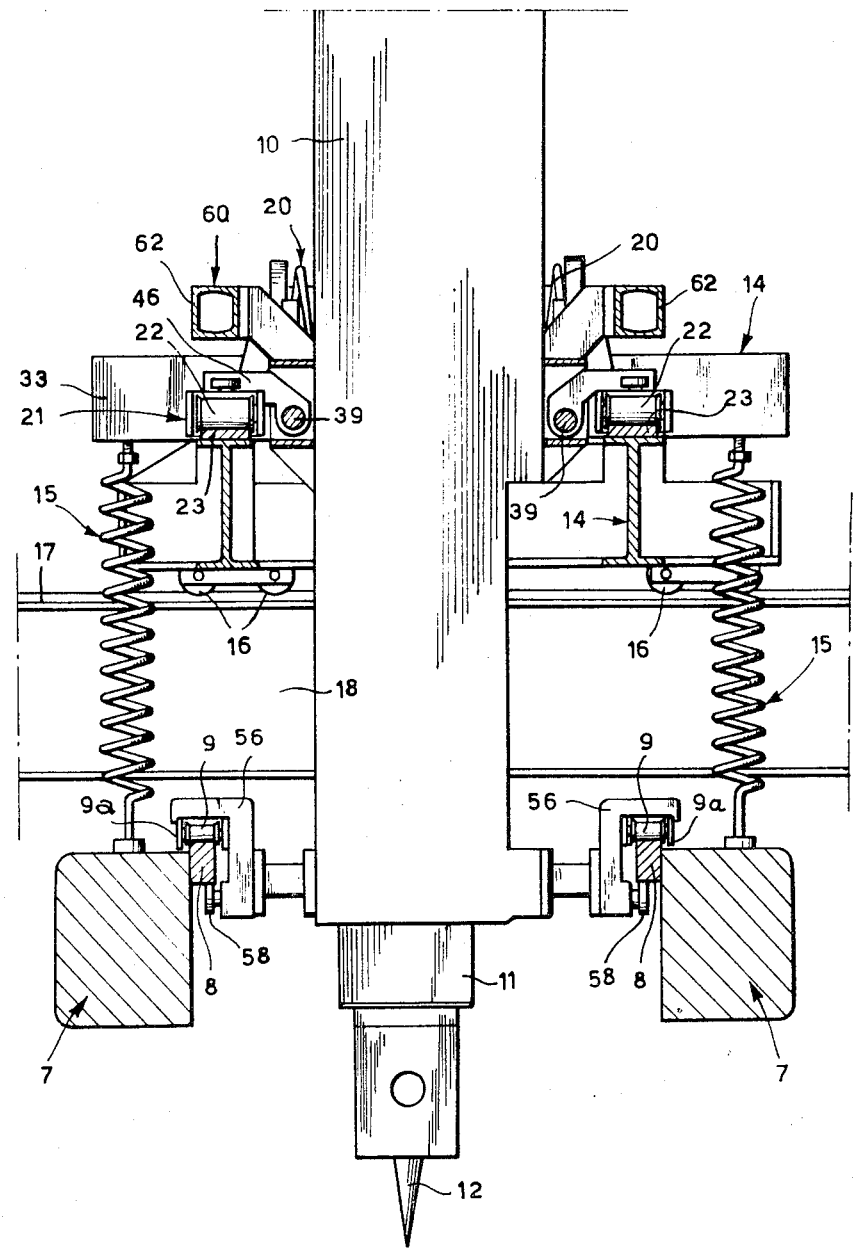
FIG. 4 is a view on an enlarged scale along the line IV—IV of FIG. 2.

The bridge 7 is itself provided with further precision rails 8 extending between the rails 5. The rails 8 form a transverse guide track for four pairs of rollers 9 which are carried in mountings 9a fixed slidably on arms 56 (FIG. 4) attached to a headstock 10 from which a working head incorporating a probe 12 is suspended by means of a column 11 which slides vertically in the headstock 10 and extends through the cavity of the frame of the bridge 7. Clamping rollers 58 are mounted in the arms 56 and are biased upwardly to reinforce the hold of the rollers 9 downwards on the rails 8.

Nearly the whole weight of the first bridge 7 is carried by a second bridge 14 through elastic suspension units 15 at the corners of the two bridges. The second bridge 14 is also in the form of a generally rectangular frame and is supported on pairs of rollers 16 carried in mountings 16a at each corner of the bridge 14 and which are movable along a longitudinal load-bearing track.

This track comprises two rails 17 which are substantially parallel to and overlie the longitudinal guide rails 5. The rails 17 are each secured to a girder 18 fixed on the columns 3. Known means (not illustrated) is provided to ensure that the bridge 14 moves longitudinally with the first bridge 7.

As is seen generally in FIG. 1, the headstock 10 is connected by elastic suspension units 20 to a carriage 21 which is movable on pairs of rollers 22 on a transverse load-bearing track in the form of parallel rails 23 fixed on the second bridge 14 and extending substantially parallel to the transverse guide rails 8.

Figure 3:
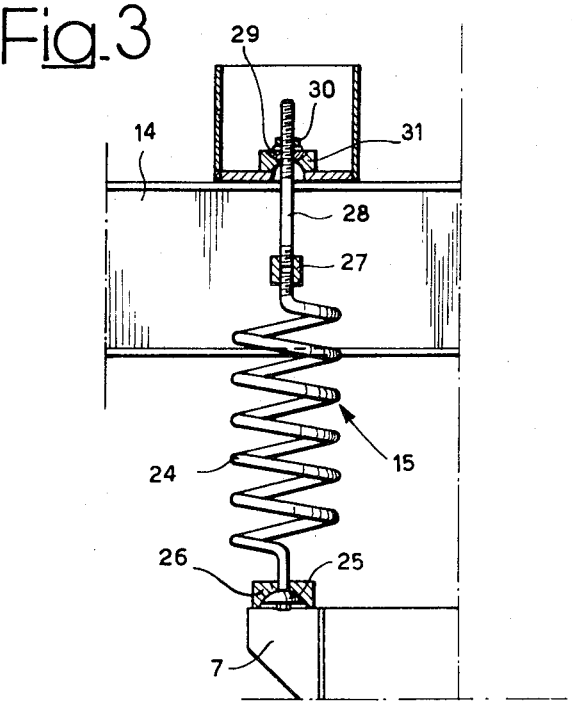
FIG. 3 is an enlarged fragmentary view of a detail from FIG. 2, showing the construction of an elastic suspension unit connected between the first and second bridges of the machine.

Details of the suspension arrangements are seen in FIGS. 2 to 6. As is best seen in FIGS. 2 and 3, the elastic suspension unit 15 between each corner of the first and second bridges 7 and 14 comprises a tension coil spring 24 arranged vertically, its lower end connected to the bridge 7 by a spherical nut 25 (FIG. 3) seated in a spherical boss 26 fast with the bridge 7. The upper end of the spring is screwed into a collar 27 into which is also screwed a bolt 28 that has a spherical washer 29 and a nut 30 at its upper end, the washer 29 seating in a spherical boss 31 which bears on the bottom surface 32 of a U-shaped crossbar 33 of the bridge 14. The preload on the spring, which determines the proportion of the weight of the first bridge 7 which is borne by the second bridge 14, can be varied by adjusting the nut 30.

When the machine is very large, it is usually desirable that a nest of springs be used rather than a single spring 24 as it is necessary for the suspension unit to be readily extensible without a large change in its tension and the provision of several springs, arranged between suitable end plates, eliminates the need for the single long spring which would otherwise be necessary.

It will be clear that the suspension arrangement described above has a very low friction, virtually the only friction source being the internal friction of the springs. Arrangements with a high friction are undesirable since they are capable, under deflection of the load-bearing tracks, of generating forces which deflect the guide track beyond its permissible error.

The suspension system for the headstock 10 relatively to the carriage 21 is seen in FIGS. 2, 4, 5 and 6. The headstock is fixed in a surrounding frame 60 composed of transverse tubular members 62 and U-shaped longitudinal members 63 attached rigidly to each other and to the headstock 10. There is a suspension unit 20 at each corner of the frame 60, each unit comprising a horizontal compression coil spring 34 whose inner end is contained in a boxlike housing 35 screwed on to a bar 36, one such bar 36 being located along each longitudinal side of the frame 60. The housing 35 are adjustably secured by bolts 64 (FIG. 5) to the U-shaped member 63 of the frame 60. The bar 36 is screw threaded with threads of opposite sense that meet at its middle, where a nut 37 is fixed to it. The positions of the housing 35, and thus the force in the springs 34, can be adjusted when the machine is set up or at a later stage by slackening the bolts 64 and turning the adjusting nut 37 to move the housing 35 inward or outward until the required force is exerted in the springs, and retightening the bolts 64 in their new positions.

Figure 5:
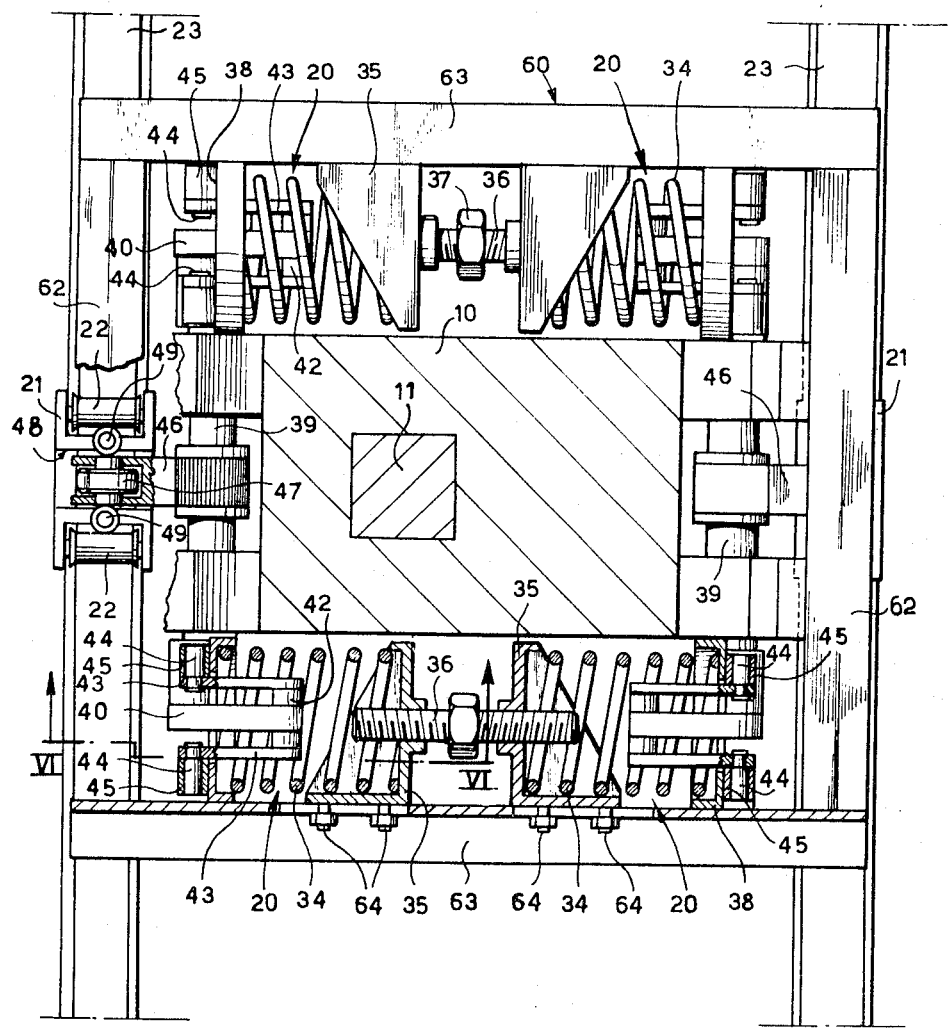
FIG. 5 is a similar view, partly broken away, on the line V—V of FIG. 2.

The outer end of each spring 34 extends beyond the housing 35 and bears on a pierced retaining cap 38 (FIGS. 5 and 6). Rotatable in each transverse side of the headstock below the springs 34 is a shaft 39 extending parallel to the rails 23. Each shaft 39 has two U-shaped levers 40 attached to it near its ends, each lever 40 extending through the cavity of a cap 38 into the space surrounded by a spring 34 and being connected by a pivot 42 to two linkages 43 that extend back to the cap 38 and are in turn pivoted by means of pins 44 to lugs 45 on the outwardly facing surface of the cap.

On the central zone of each shaft 39 is fixed a crank arm 46 which carries a roller 47 at its tip to bear on a load-bearing floor surface of a slot 48 (FIG. 5) formed between the rollers 22 on each side of the carriage 21.

Side rollers 49 mounted on the carriage 21 hold each arm 46 centrally in the slot 48. The suspension system is so adjusted that the greater part of the weight of the headstock 10 bears on the carriage 21 through the arms 46, and this weight is therefore carried by the transverse load-bearing track rails 23. Provided relatively extensible springs 34 are used in the suspensions 20, it will be clear that minor sagging of the transverse rails 23 such as is liable to occur with movement of the headstock in its transverse stroke, will have little effect on the amount of the load carried by the transverse guide rails 8, and under appropriate conditions cause only a minor deflection of these guide rails, within their permissible error.

By suspending the headstock elastically on the carriage so that the greater part of the headstock weight is carried directly by the second bridge 14, the load distribution on the first bridge 7 does not change materially regardless of the position of the headstock and carriage in their transverse stroke. Accordingly, the load on each of the suspension units 15 connected between the first and second bridges remains balanced for all positions of the headstock.

The suspension units 20, since they act through a lever system rather than directly as in the case of the units 15, have a somewhat higher friction than the units 15. However, as the weight they support is less than that supported by the units 15, the slight loss of sensitivity is not material and is worthwhile in view of the compactness of the horizontal arrangement of the springs 34 and the fact that the units 20 do not project awkwardly in any direction.

It will be obvious that with variations of the position of the probe in the working space, the load distribution on the load-bearing tracks, longitudinal and transverse, will vary considerably, and local sagging will occur. In a large machine the sag may be several millimeters. However, if the suspension units 15 and 20 are so constructed and adjusted that the greater part of the weight of the moving members is carried by the load-bearing tracks, and that the suspension units are sufficiently extensible to permit this sagging to be absorbed in the springs without markedly affecting the force in them, the deflection caused in the guide tracks will remain below its permissible value. This allows the guide tracks to be made as light precision members, and allows the load-bearing tracks to be designed by taking into account only their breakage coefficients and safety factors. The result is that they need be far less heavy and rigid than would be the case if a single precision track bore the full weight of the moving members. The reduction in weight may be more than fivefold in large machines, and there is accordingly a large reduction in cost and an increase in the dynamic response of the system.

Movements of the bridges 7 and 14 together with each other, movements of the carriage 21 and detector head 10 together with each other, and vertical movement of the column 11 are regulated by independent motors and transmission means of conventional design (not shown). These controls are centralized in a console 13, (FIG. 1) known per se. The console also incorporates a programmer for the longitudinal and transverse movements of the bridges and headstock and carriage and the vertical movement of the column 11, as well as apparatus for recording the emitted signals. These signals correspond of course to the position of the probe 12 in the system of coordinates, and thus provide the required measurements of the workpiece 2.

It will be clear from what has been said above that the system is independent of the weight and position of the workpiece on its bed.

What I claim is:

1. A machine for working on a workpiece by passing a working head over the workpiece in accordance with a path in which there is a fixed maximum permissible error, the machine comprising a bed on which the workpiece is adapted to rest, a longitudinal guide track composed of parallel guide members supported above the bed, a first bridge mounted on the longitudinal track and movable along it, a longitudinal load-bearing track composed of parallel load-bearing members spaced away from the longitudinal guide track and extending substantially parallel to it, a second bridge mounted on the longitudinal load-bearing track for movement with the first bridge, a transverse guide track supported on the first bridge and extending transversely of the longitudinal guide track, the longitudinal and transverse guide tracks defining the path which has the maximum permissible error, a headstock movable along the transverse guide track and carrying a working head that is adapted to work on the workpiece, a transverse load-bearing track supported on the second bridge and extending substantially parallel to the transverse load-bearing track for movement with the headstocks elastic suspension means arranged between the carriage and the headstock to ensure that the transverse guide track is not deflected beyond its maximum permissible error in any transverse position of the headstock, and elastic suspension means connected between the first bridge and the second bridge to ensure that the longitudinal guide track is not deflected beyond its maximum permissible error in any longitudinal position of the headstock.

2. The machine of claim 1 in which the elastic suspension means connected between the first bridge and the second bridge comprises at least one coil spring at each corner of the bridges.

3. The machine of claim 2 in which the coil spring is vertically arranged, one end of the spring being connected to the first bridge and the other end to the second bridge.

4. The machine of claim 3 in which the spring is a tension spring.

5. The machine of claim 1 in which the elastic suspension means between the carriage and the headstock comprises at least one coil spring.

6. The machine of claim 5 in which the coil spring is a horizontally arranged compression spring, one end thereof being connected to the headstock and the other to a linkage pivoted to a lever that is in turn pivotable about a point on the headstock the lever being fast on a shaft which has an arm fitted with a roller to bear on the carriage and transmit to it a substantial portion of the weight of the headstock.

7. The machine of claim 1 including means to vary the load in the elastic suspension means between the first and second bridges.

* * * * *